US012586117B2

(12) United States Patent
Rath et al.

(10) Patent No.: US 12,586,117 B2
(45) Date of Patent: Mar. 24, 2026

(54) METHODS AND SYSTEM FOR AUTOMATIC POPULATION OF ITEM RECOMMENDATIONS IN RETAIL WEBSITE IN RESPONSE TO ITEM SELECTIONS

(71) Applicant: Target Brands, Inc., Minneapolis, MN (US)

(72) Inventors: Bhavtosh Rath, Minneapolis, MN (US); Amit Pande, Ames, IA (US)

(73) Assignee: Target Brands, Inc., Minneapolis, MN (US)

( * ) Notice: Subject to any disclaimer, the term of this patent is extended or adjusted under 35 U.S.C. 154(b) by 250 days.

(21) Appl. No.: 18/357,648

(22) Filed: Jul. 24, 2023

(65) Prior Publication Data

US 2024/0037631 A1 Feb. 1, 2024

Related U.S. Application Data

(60) Provisional application No. 63/392,423, filed on Jul. 26, 2022.

(51) Int. Cl.
*G06Q 30/0601* (2023.01)
*G06N 3/042* (2023.01)

(52) U.S. Cl.
CPC ......... *G06Q 30/0631* (2013.01); *G06N 3/042* (2023.01); *G06Q 30/0633* (2013.01); *G06Q 30/0603* (2013.01)

(58) Field of Classification Search
CPC ........... G06Q 30/0631; G06Q 30/0633; G06Q 30/0603; G06Q 30/0601–0645; G06Q 30/06311; G06Q 30/06312; G06Q 30/08; G06N 3/042; G06N 3/045; G06N 3/08
USPC .............................................. 705/26.1–27.2
See application file for complete search history.

(56) References Cited

U.S. PATENT DOCUMENTS

| | | | |
|---|---|---|---|
| 7,908,287 | B1 | 3/2011 | Katragadda |
| 8,620,767 | B2 | 12/2013 | Linden et al. |
| 9,471,709 | B1 | 10/2016 | Zinenko et al. |
| 10,775,966 | B2 | 9/2020 | Wu et al. |
| 2007/0050352 | A1 | 3/2007 | Kim |
| 2021/0081717 | A1* | 3/2021 | Creed .................... G06N 5/022 |
| 2022/0155940 | A1* | 5/2022 | Olbrich .............. G06Q 30/0631 |
| 2022/0222706 | A1* | 7/2022 | Arora ................. G06Q 30/0256 |
| 2022/0351021 | A1* | 11/2022 | Biswas ................ G06N 3/0464 |

OTHER PUBLICATIONS

Building a Recommender System Using Graph Neural Networks, published Decathlon Digital (2021) (Year: 2021).*

(Continued)

*Primary Examiner* — Ashley D Preston
(74) *Attorney, Agent, or Firm* — Merchant & Gould P.C.

(57) ABSTRACT

A recommendation system is disclosed. The recommendation system may receive a sequence of items selected by a user. Based on the sequence of items, the recommendation system may recommend one or more items. To do so, the recommendation system may apply a graph neural network. The recommendation system may receive a second sequence of items that includes the first sequence of items plus one or more items. Based on the second sequence of items, the recommendation system may recommend one or more different items by applying the graph neural network.

17 Claims, 8 Drawing Sheets

500

(56) References Cited

OTHER PUBLICATIONS

Dynamic Graph Neural Networks for Sequential Recommendation, published in the Journal of Latex Class Files, vol. 14 (2015) (Year: 2015).*

Chen, Tianwen et al., Handling Information Loss of Graph Neural Networks for Session-based Recommendation (The Hong Kong University of Science and Technology, Clear Water Bay, Kowloon, Hong Kong), Association for Computer Machinery, 2020, 9 Pages.

Latifi, Sara et al., Streaming Session-Based Recommendation: When Graph Neural Networks meet the Neighborhood (University of Klagenfurt, Austria), 2022, 11 Pages.

Wu, Shu et al., Session-based Recommendation with Graph Neural Networks, (Center for Research of Intelligent Perception and Computing, National Laboratory of Pattern Recognition, Institute of Automation, Chinese Academy of Sciences, University of Chinese Academy of Sciences, School of Computer and Communication Engineering, University of Science and Technology Beijing, School of Software Engineering, Tongji University, Microsoft Research Asia), Association for the Advancement of Artificial Intelligence, 2019, 9 Pages.

\* cited by examiner

600

Receive Training Data 602

Train Model 604

700

METHODS AND SYSTEM FOR AUTOMATIC POPULATION OF ITEM RECOMMENDATIONS IN RETAIL WEBSITE IN RESPONSE TO ITEM SELECTIONS

CROSS-REFERENCE TO RELATED APPLICATIONS

The present application claims priority to U.S. Provisional Application No. 63/392,423, filed on Jul. 26, 2022, the disclosure of which is hereby incorporated by reference in its entirety.

BACKGROUND

Search boxes provided by search providers often include an automatic completion feature that predicts a search string that a user may be searching for, based on a combination of popular search strings, and optionally previous user behavior. When a user visits a search provider website and begins entering text, suggested completion of text phrases may appear to the user.

In the context of a retail website, recommendations for items to purchase are commonly provided, either in response to past browsing history, or in response to a search. However, in this context the recommendations that are generated may be limited to items that meet the exact searches previously performed by the user, based on the immediately preceding viewed or purchased item, or based on other limited data sets. Accordingly, the recommendations provided in a retail website typically have limited functionality and utility than may be provided by a search bar of a more generalized search provider. At the same time, use of recommendations generated by a generalized search provider is usually inappropriate, since a visitor to a retail website wishes to limit his or her search, and a retail website typically limits its recommendations, to the items available on that retail website or offered by that retailer.

SUMMARY

Aspects of the present disclosure are directed to a recommendation system. The recommendation system may receive a sequence of items selections from a user session. Based on the sequence of item selections, the recommendation system may recommend one or more items. To do so, the recommendation system may, in some embodiments, apply a graph neural network.

In a first aspect, a method for providing session-based recommendations is disclosed. The method comprises receiving, at a user interface, a selection of a first item by a user; in response to the selection of the first item, applying a neural network model to a first item sequence including the first item to generate a first recommendation; presenting, in the user interface, the first recommendation; receiving, at the user interface, a selection of a second item by the user; in response to the selection of the second item, applying the neural network model to a second item sequence including the first item followed by the second item to generate a second recommendation, the second recommendation being based at least in part on both the first item and the second item; and presenting, in the user interface, the second recommendation; wherein the user interface belongs to one or more of a retail website or a retail mobile application; wherein the first recommendation includes a first set of items; and wherein the second recommendation includes a second set of items.

In a second aspect, a retail web server system configured to provide recommendations to a user interface accessible to one or more users is disclosed. The retail web server system comprises at least one processor; a memory subsystem including one or more memories, the memory subsystem storing instructions which, when executed by the at least one processor, cause the retail web server system to perform: receiving, at a user interface, a selection of a first item by a user; in response to the selection of the first item, applying a neural network model to a first item sequence including the first item to generate a first recommendation; presenting, in the user interface, the first recommendation; receiving, at the user interface, a selection of a second item by the user; in response to the selection of the second item, applying the neural network model to a second item sequence including the first item followed by the second item to generate a second recommendation; and presenting, in the user interface, the second recommendation; wherein the first recommendation includes a first set of items; and wherein the second recommendation includes a second set of items.

In a third aspect, a method for providing session-based recommendations is disclosed. The method comprises receiving, at a user interface, a selection of a first item by a user; in response to the selection of the first item, applying a neural network model to a first item sequence including the first item to generate a first recommendation; presenting, in the user interface, the first recommendation; receiving, at the user interface, a selection of a second item by the user; in response to the selection of the second item, applying the neural network model to a second item sequence including the first item followed by the second item to generate a second recommendation; and presenting, in the user interface, the second recommendation; wherein the first recommendation includes a first set of items; wherein the second recommendation includes a second set of items; wherein receiving the selection of the first item includes receiving an indication of adding the first item to a digital shopping cart; wherein receiving the selection of the second item includes receiving an indication of viewing the second item; and wherein applying the neural network model to the second item sequence including the first item followed by the second item to generate the second recommendation comprises applying a greater weight to the first item than to the second item based at least in part on the adding of the first item to the digital shopping cart.

DETAILED DESCRIPTION

Figure 1:
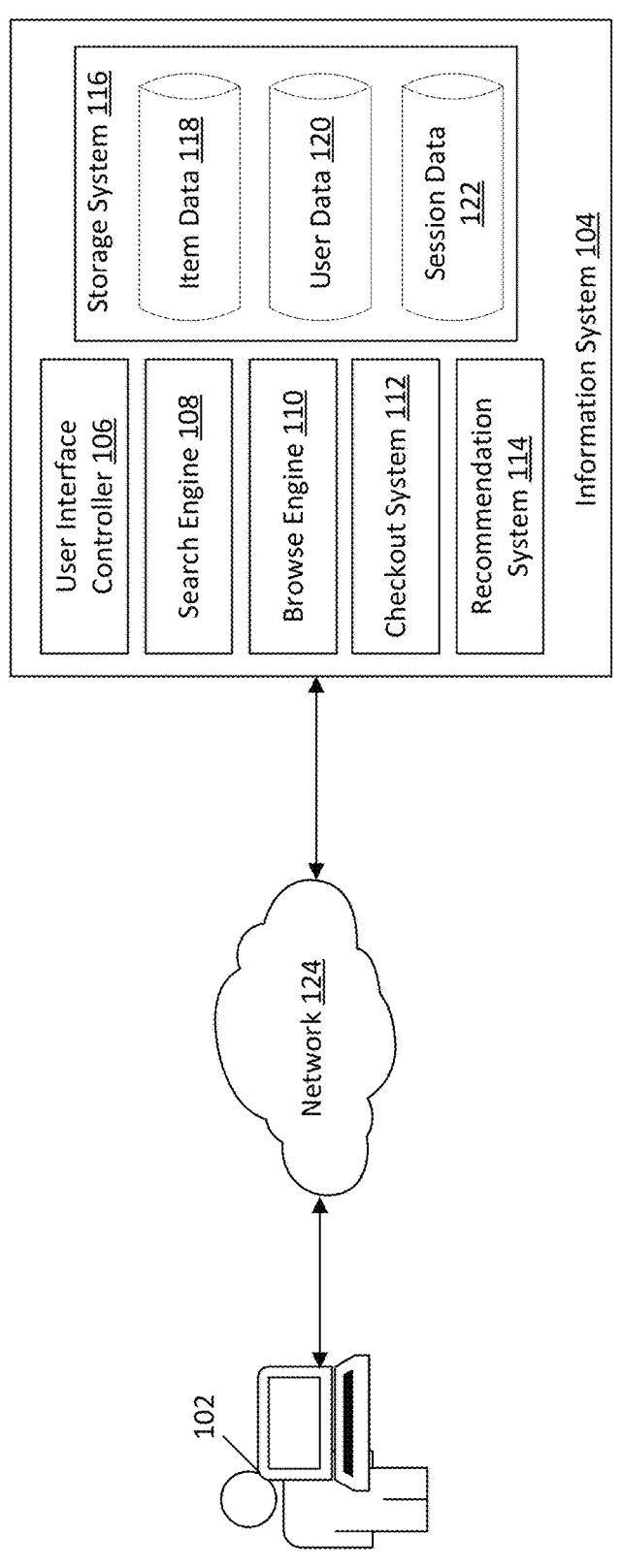
FIG. 1 illustrates a network environment in which aspects of the present disclosure may be implemented.

As briefly described above, embodiments of the present invention are directed to an improved process for providing recommended items to a user at a retail website, for example based on prior activity of the user visiting the website. In particular examples, the recommended items are provided based on combinations of prior viewed or prior selected items, such as items added to that user's shopping cart.

In example implementations, a graph neural network is used which imparts importance to an order in which items are added to a cart or otherwise selected, as well as the recency of the items. In a graph, each node may represent an item, and each edge may represent a transition from one item to the next. The graph neural network may include one or more edge-order preserving aggregation layers, as well as one or more shortcut graph attention layers to generate final item embeddings for all nodes (items) under consideration as potential recommendations.

In some examples, when implemented using items added to a user's shopping cart, it can be seen that selecting and adding multiple items in a given session may significantly change the automated recommendations that are generated. For example, in a given session, if a user adds milk to his or her shopping cart, the automated recommendations may include a tomato, a banana, or onions. This is because the model might predict that the user is interested in purchasing perishable items. However, if the user then adds eggs to his or her shopping cart, in addition to the milk, the recommendations may change to include bread, cereal, or a banana. This is because the user may be instead identified as being interested in purchasing breakfast items, rather than simply perishable items. Still further, if the user then adds sugar to his or her cart, the recommendations may change to include cake mix, icing, or serial. This is because the user may now be identified as being interested in purchasing baking items, rather than breakfast or perishable items. Accordingly, as the user adds more items or different items to his or her cart, the user may be better identified as interested in particular item types.

While the above example is provided in the context of a user adding items to his or her shopping cart, similar examples are possible, in some examples, using solely browsing history. For example, items viewed by the user might indicate that the user is interested in a particular class or type of item. In further examples, items selected for purchase (e.g., by being added to the user's shopping cart) may be weighted higher than items viewed by the user, while both types of activity may be used to generate recommendations. Furthermore, in some examples, if a first item was selected more recently than a second item, then the first item may be weighted higher than the second item.

In example implementations, the graph neural network used provides real-time inferencing, by generating recommendations and generating predictions as a given session evolves, and as a user's activity is tracked. By way of contrast, existing solutions might precompute recommendations for individual items, and look up those recommendations in response to receipt of a user selection of that item. Such pre-computation may avoid real time calculations, at the expense of accuracy.

In one example implementation, a retail web server, hosting a retail website, may receive a selection of a first item by a user. The receipt of the first item may represent adding the first item to a cart, or otherwise selecting the first item to be viewed. In response to the selection of the first item, a first recommendation for one or more items may be generated. The selection may be generated by a neural network recommendation model, such as a graph neural network as described above. The recommendation or recommendations may be presented to the user in conjunction with presentation of selected item, for example alongside the item in a shopping cart user interface.

Continuing with the example implementation, the user may then select, at the retail website, one or more other items, such as a second item. This can include adding the second item to the user's shopping cart. In response to the selection of that second item, the method can include generating a second recommendation for one or more items based on both the first item and the second item at the neural network recommendation model. This second recommendation may then be presented to the user at the user interface, for example in conjunction with a display of a shopping cart including both the first and second item.

In accordance with the above examples, the generation of item recommendations may be performed at the time items are added to a set of user selections, rather than being precomputed. Furthermore, the first and second items may be items corresponding to selections by the user within a common browsing session, or within the same shopping cart.

FIG. 1 illustrates an example network environment 100 in which aspects of the present disclosure may be implemented. In the example shown, the environment 100 includes a user 102 communicatively coupled with an information system 104 via the network 124.

The user 102 may be an entity that is searching for or purchasing an item. In some embodiments, the user 102 is a person. In other embodiments, the user 102 may be a software program. The user 102 may be a customer, or potential customer, of a retailer, vendor, or other business. In some embodiments, the user 102 may use a computing device to access the information system 104 over the network 124. The computing device may be, for example, a computer or a mobile device, such as a mobile phone. To access the information system 104, the user 102 may use a browser running on the computing device to access a website or system associated with the information system 104. In some embodiments, the user 102 may use a mobile application that is associated with the information system 104. Although the FIG. 1 illustrates a single user 102, there may be a plurality of users that access the information system 104 and that perform operations that are described herein as performed by the user 102. One or more of the plurality of users may use a different type of computing device, and the plurality of users may access aspects of the information system 104 simultaneously.

The information system 104 may be a collection of software, hardware, data, and networks. The information system 104 may be associated with an organization. For example, the organization may use, develop, maintain, own, or otherwise be associated with the components of the information system 104. In some embodiments, the information system 104 is associated with a retailer. The information system 104 may include one or more frontend systems via which the user 102 may interact with the information system 104. The frontend systems may include a website or a mobile application and may include user interfaces that are displayed on a browser or mobile application running on the user 102's computing device. The information system 104 may include web servers, application servers, and database servers. Some components of the information system 104 may operate in a common computing environment. Some components of the information system 104 may operate in different computing environments and communicate over a network, such as the internet or an intranet. Some components of the information system 104 may be hosted in a cloud environment. Some components of the information system 104 may be developed and maintained by a third-party (e.g., an entity different than the organization with which the information system 104 is associated).

In the example of FIG. 1, the information system 104 includes a user interface controller 106, a search engine 108, a browser engine 110, a checkout system 112, a recommendation system 114, and a storage system 116, which may include item data 118, user data 120, and session data 122. In other embodiments, the information system 104 may include more or fewer components. Furthermore, operations and features of components of the information system 104 may overlap and vary depending on the embodiment.

The user interface controller 106 may facilitate communication with frontend components of the information system 104. For example, the user interface controller 106 may provide website content to a browser and respond to requests made by the website. The user interface controller 106 may include a plurality of APIs that may be called by frontend systems such as a mobile application or website. In some instances, the user interface controller 106 may also manage user interface displays. In response to receiving a request, the user interface controller 106 may call one or more other components of the information system 104 to handle aspects of the request. Furthermore, the user interface controller 106 may provide a response to a request to a user.

The search engine 108 may receive an input and, based on the input, select one or more items from a collection of items. The input may be received via a search tool displayed in a user interface of a website or mobile application. In some embodiments, the input may include one or more of a textual input, a visual input (e.g., an image), or a voice input. If the input is a text input, the search engine 108 may match the text input to text associated items from a catalog of items. For example, the search engine 108 may compare the text input to one or more of a title, description, brand, review, metadata, or other information associated with an item. Based on the comparison, the search engine 108 may select one or more items from the item catalog that best match the text input and display the one or more items on a search results page. In some instances, the search engine 108 may select one item and cause an item display page for the one item to be displayed to the user. In some embodiments, the search engine 108 may use machine learning to process an input and to compare the input with item data. For example, the search engine 108 may use natural language processing and understanding techniques and may use a deep learning model to compare an input text with item text.

The browse engine 110 may receive a selection of a category and return subcategories associated with the category or items associated with the category. For example, to search for an item, the user 102 may select, via a user interface associated with the information system 104, a category or subcategory of the item. In response, the browse engine 110 may select one or more items associated with the selected category or subcategory and display the one or more selected items. Furthermore, the browse engine 110 may display subcategories of the category or subcategory selected by the user 102.

The checkout system 112 may, among other things, track user purchases of items. The checkout system 112 may include a digital shopping cart to which a user may add items prior to purchasing the items. As an example, after the search engine 108 or browse engine 110 provides an item to the user 102, the user 102 may decide whether to purchase the item. If the user 102 elects to do so, the user 102 may use the checkout system 112. For example, the user 102 may select an input field to add an item to the digital shopping cart. Once the user is ready to purchase one or more items added to the digital shopping cart, the user may navigate to a checkout page of the checkout system 112. The checkout system 112 may communicate with other systems, such as a shipping, inventory, or payment system.

The recommendation system 114 may recommend one or more items to the user 102 and cause the one or more recommended items to be displayed to the user via a user interface. To make recommendations, the recommendation system may consider activity data of the user 102. In some examples, the recommendation system 114 may consider session-based activity data for the user 102. In some embodiments, the recommendation system 114 may include one or more machine learning models to generate one or more item recommendations. For example, the recommendation system 114 may use a graph neural network to generate one or more item recommendations. In some examples, the graph neural network may receive, as input, a sequence of items selected by the user 102 during a session. Depending on the embodiments, a selected item may be an item that is added to a cart, viewed, or purchased by the user 102. In some embodiments, the recommendation system 114 may receive data from one or more of the user interface controller 106, the search engine 108, the browse engine 110, the checkout system 112, or the storage system 116 during training or inference.

The storage system 116 may include one or more databases for storing data of the information system 104. The data may, for example, include data related to retail. The storage system 116 may also establish protocols and manage access rights for accessing some data of the information system 104. In the example shown, the storage system 116 includes item data 118, user data 120, and session data 122. The data 118-122 may be stored in a common datastore or in separate datastores. In other examples, the storage system 104 may include more or less data than illustrated in the example of FIG. 1.

The item data 118 may include data for a plurality of items. The plurality of items may be from a catalog of items of a retailer. For each item of the plurality of items, the item data 118 may store one or more images and textual data, such as a title, description, or attributes. In some embodiments, the item data 118 may be updated as items are added, removed, or edited.

The user data 120 may include data for one or more users, such as the user 102. For example, the user data 120 may include data for one or more customers, or potential customers, of a retailer. For each user, the user data 120 may include, but is not limited to, one or more of the following: user biographical data; a user ID; user payment data; user activity data, such as previous item views, item purchases, search queries, browse selections, reviews, ratings, returns, or other actions; user account information; or other data associated with a user.

The session data 122 may include data for user sessions. Depending on the embodiment and depending on the user 102, a time period for a session may vary. For example, when a user accesses a website of the information system 104, a session may begin, and the session may end when the user leaves the website. As another example, if the user is using a mobile application, a session may begin when the user opens the mobile application and may end when the user closes the mobile application or when the user puts the mobile application to sleep. In some embodiments, a session may persist across different visits of a user to the website or across uses of the mobile application. For example, in some embodiments, the user may select an input field to begin a session, and the session may continue until the user elects to end the session, thereby persisting across different uses of the website or mobile application if the user keeps the session active. In some embodiments, the information system 104 may persist a session so long as a user has one or more items in a digital shopping cart. In some embodiments, a session may persist for a dynamic or fixed amount of time, such as a half hour, an hour, a day, or a week. In some embodiments, the information system 104 may end a session in response to detecting user inactivity. For instance, if a user accesses a website of the information system 104 and does not take any action for a defined amount of time (e.g., ten minutes), then the information system 104 may end the session even if the user did not leave the website.

For each session, the session data 122 may include item data, user data, and user activity data associated with the session. The user data may include a user identifier and other data from the user data 120 for the user. Additionally, the session data may include items selected by the user during the session. The session data may include an ordered sequence of items selected by the user during a session. Depending on the embodiments, a selected item may be an item that is added to a cart, viewed, or purchased by the user 102. For each selected item, the session data 122 may include data for the item from the item data 118 and may include metadata for the selected item (e.g., a time at which the item was selected; a way the item was selected, such as via search or browse, or other data related to the selection of the item). The selected item data may also indicate a type of selection, such as whether the item was viewed, added to a cart, or purchased. Additionally, the session data 122 may include transition data corresponding to a transition from one selected item to a next selected item.

The network 124 may be, for example, a wireless network, a wired network, a virtual network, the internet, or another type of network. The network 124 may be divided into subnetworks, and the subnetworks may be different types of networks or the same type of network. In different embodiments, the network environment 100 can include a different network configuration than shown in FIG. 1, and the network environment 100 may include more or fewer components than those illustrated.

Figure 2:
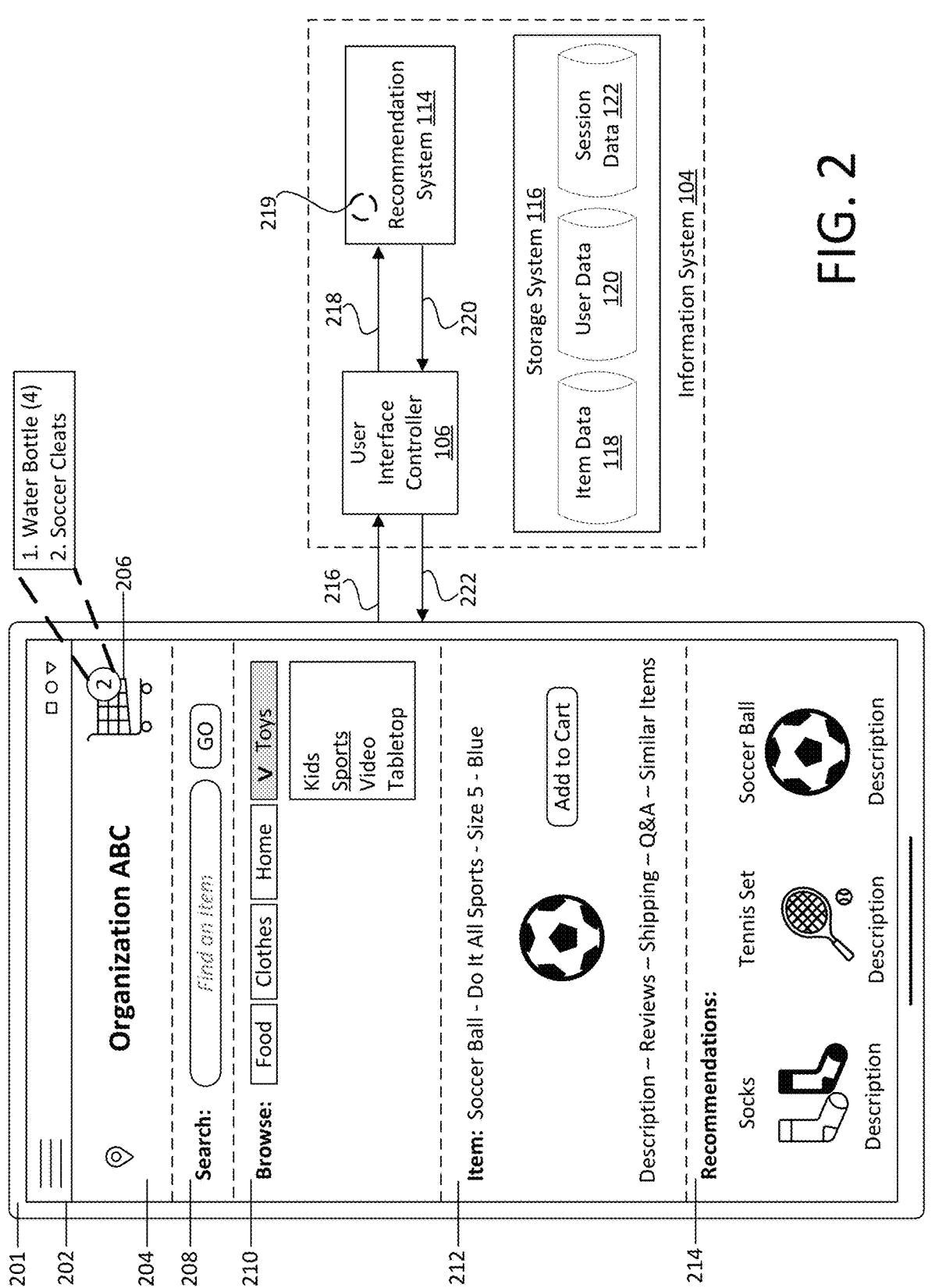
FIG. 2 illustrates a schematic diagram of a user interface and an information system.

FIG. 2 illustrates a schematic diagram of aspects of the present disclosure. The example of FIG. 2 includes a computing device 201 displaying an example user interface 202. FIG. 2 further includes example operations 216-222 that may be performed by components illustrated in FIG. 1.

The computing device 201 may be a device used by the user 102. The computing device 201 may be, for example, a mobile phone, a computer, a smart watch, an IoT device, or another computing device.

The user interface 202 may be displayed on the device 201. The user interface 202 may be an interface of a retail website that is associated with the information system 104. The user interface 202 may also be an interface of a mobile application associated with the information system 104. In the example shown, the user interface 202 includes a plurality of components, including a header 204, a shopping cart 206, a search tool 208, a browse region 210, an item display region 212, and recommendation region 214. In some embodiments, one or more components of the user interface 204 may be part of other user interfaces associated with the information system 104. Furthermore, the user interface 202 may include more or fewer components than those illustrated in the example of FIG. 2.

The header 204 may include information related to an organization associated with the information system 104. For example, the header 204 may include a name, location data, or other data associated with a retailer. The header 204 may also include information related to a user that is using the user interface 202 or to a current session of the user.

The shopping cart 206 may be an icon that is linked to a checkout system or shopping cart application of the information system 104. The shopping cart 206 may further include an indication of a number of items that are in the shopping cart for a user. When the shopping cart 206 is selected, a user interface of a checkout or shopping cart application may be displayed. In the example shown, the shopping cart 206 includes two items: (1) water bottles with a quantity of 4; and (2) soccer cleats. The shopping cart 206 may further include data related to an order in which the items were added. For instance, in the example shown, the four water bottles may have been added before the soccer cleats.

The search tool 208 may be used to search for an item. The search tool 208 may be part of, or may communicate with, the search engine 108 of FIG. 1. The search tool 208 may include an input field via which a user may input a search string. Furthermore, the search tool 208 may include a button that, when selected, causes the search engine 108 to execute a search and return one or more items. The one or more items may be displayed in a results region, and the user 102 may then select one of the displayed results. In some embodiments, the search tool 208 may be coupled with a microphone of a computing device so that the search tool 208 may receive a voice input. In some embodiments, the search tool 208 may include an input field for receive, or the search tool 208 may include one or more input fields for receiving other inputs (e.g., additional textual or visual inputs, or inputs having a different data type).

The browse region 210 may include one or more selectable categories or subcategories. In the example shown, the browse region 210 includes a selectable category for Food, Clothes, Home, and Toys. Furthermore, in the example shown, the Toys category is selected, and in response, the user interface 202 displays subcategories associated with Toys, including Kids, Sports, Video, and Tabletop. In the example shown, the user 102 may select the Sports subcategory. In some embodiments, the user interface 202 may display one or more items in response to the user selecting the Toys category or the Sports subcategory, and the user may select one or more of the displayed items.

The item display region 212 includes a display of data for an item. For example, the user 102 may select an item that is returned by one or more of the search tool 208 or the browse region 210. Data for the selected item may be displayed in the item display region 212. In the example shown, the item display region 212 includes an item name, brand, characteristics, and image. Furthermore, the item display region may also include other data related to the item, such as a description, reviews, shipping information, questions about the item, and items that are similar to the item (e.g., different colors, brands, or complementary items). Additionally, the item display region 212 may include a button to add the item to a cart. In response to a selection of a button to add an item to cart, the item (e.g., the soccer ball) may be added to a digital shopping cart, and the shopping cart 206 may be updated. In some embodiments, the item display region 212 may include other options related to the item (e.g., a quantity input field, a save for later input field, or another input field). Furthermore, in some embodiments, the item display region 212 may include a plurality of items.

The recommendation region 214 may include one or more recommended items. The recommended items may, in some instances, be selected by the recommendation system 114. Each of the recommended items may include a link to an item display page for the recommended item. Other options may also be displayed for each recommended item, such as an add to cart option, a dismiss option, or an option to see more items like the recommended item. In the example shown, the recommended items include socks, a tennis set, and a soccer ball. In some embodiments, the recommendation region 214 may include selectable arrows or an input field so that the user 102 may view more recommended items.

The operations 216-222 illustrate example operations and data flows between components of FIGS. 1-2.

At operation 216, the device 201 may provide an item selection to the use interface controller 106. There may be various ways in which an item is selected. For example, the user 102 may use the search tool 208 to search for an item and then may select an item in the search results. As another example, the user 102 may use the browse region 210 to browse for an item and then may select an item belonging to a category or a subcategory. As another example, a user may select an item by adding the item to a cart (e.g., by selecting the Add to Cart button). There are other ways that an item may be selected, including but not limited to, the following: hovering over an item with a touch or mouse, purchasing an item, saving an item, or performing another action for the item. In addition to providing an item selection, the device 201 may also provide other data to the user interface controller 106. For example, the device 201 may provide user data, session data, or data for other items selected by the user. Once the user interface controller 106 has received data from the device 201, the user interface controller 106 may process the data (e.g., standardize or format the data so that it may be provided to other systems).

At operation 218, the user interface controller 106 may request that the recommendation system 114 generate a recommendation of one or more items. As part of doing so, the user interface controller 106 may provide the item selection to the recommendation system 114, and in some embodiments, the user interface controller 106 may provide other data to the recommendation system 114, such as a sequence of selected items of a session to which the selected item belongs. Furthermore, the user interface controller 106 may communicate with one or more other systems. For example, the user interface controller 106 may store or retrieve data in the storage system 116, or the user interface controller 106 may call a system to handle a request received from the device 201 (e.g., calling one or more of the components in the example of FIG. 1).

At operation 219, the recommendation system 114 may generate an item recommendation. To do so, the recommendation system 114 may input data received from one or more of the user interface controller 106, the storage system 116, or another system into a machine learning model. For example, the recommendation system 114 may input a sequence of selected items into a machine learning model. In some embodiments, the machine learning model may be a graph neural network. The recommendation system 114 and generating item recommendations using the recommendation system 114 are further described below in connection with FIGS. 3, 5, and 7.

At operation 220, the recommendation system 114 may provide one or more items to the user interface controller 106 to recommend to the user of the device 201. Once the user interface controller 106 receives the one or more recommended items, the user interface controller 106 may generate a response to provide to the device 201. In addition to the one or more recommended items, the response may also include data from other systems (e.g., payment information, checkout information, search or browse results, or other data to be displayed via a user interface).

At operation 222, the user interface controller 106 may provide the response, including the one or more recommended items, to the device 201. The device 201 may then update the user interface 202 with the response data. For example, the device 201 may refresh the recommendation region 214 to include the one or more recommended items.

Figure 3:
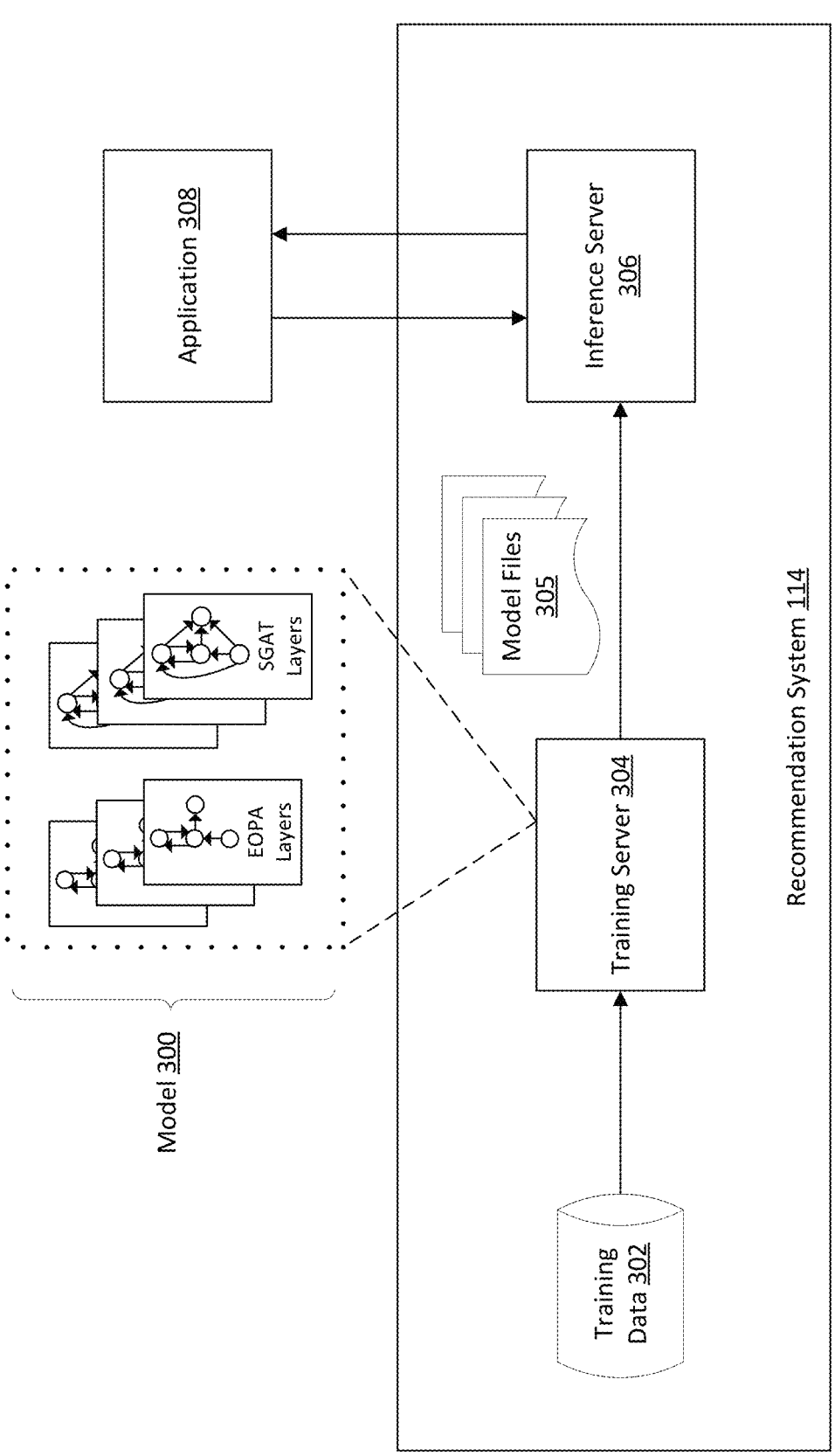
FIG. 3 illustrates an example architecture of a machine learning model used by a recommendation system.

FIG. 3 illustrates an example architecture of the recommendation system 114. In the example shown, the recommendation system 114 includes training data 302, a training server 304, a model 300, and an inference server 306.

The training data 302 may be a database including data used to train the model 300 at the training server 304. In some embodiments, the training data 302 includes previous user activity data for a plurality of users. The user activity data may be for user activity on a website, such as a retail website, or a mobile application. Example user activity data may include user activity for historical user sessions. For example, for each session of a plurality of historical user sessions, the training data 302 may include a sequence of items selected (e.g., added to a cart, viewed, purchased, etc.) by a user during the session. In some embodiments, the training data 302 may include time-filtered data, such as user activity data from the most recent 30 days, 60 days, 1 year, or another amount of time. In some embodiments, the training data 302 may include item-filtered data. For example, the training data 302 may include user activity data for only some items of a plurality of items. For instance, the training data 302 may include data for items—from a catalog of items—that have been recently selected by users (e.g., items selected at least 10 times in the last 30 days, purchased at least once in the last week, or selected in a different manner). As described below in connection with FIG. 7, labeled training instances may be derived from the historical user activity data to train the model 300. In some embodiments, each of the items corresponds with a stock keeping unit (SKU). By filtering the training data 302 by time and/or items (in some embodiments), the recommendation system 114 may train a model more quickly and in a less computationally-intensive manner, while still training the model on the most recent and relevant data. In some embodiments, the training data 302 may include data in addition to user activity data, such as contextual data that may include user biographical data, user preference data, location data, or other contextual data.

The training server 304 may be a computing environment for training a machine learning model. In some embodiments, the training server 304 may retrieve data from the training data 302 and train a machine learning model (e.g., a graph neural network) for generating recommendations. In some embodiments, the training server 304 may include one or more graphics processing units (GPUs). Furthermore, the training server 304 may include a program that uses the GPUs and data from the training data 302 to train the model 300. In some embodiments, the training server 304 may periodically update or retrain the model 300. For example, the training server 304 may retrieve updated data from the training data 302 and, based on the updated data, retrain or update the model 300. In some instances, the training server 304 may retrain the model every few days. After training the model, the training server 304 may provide the trained model 300 to the inference server 306.

The model 300 may be a machine learning model. For example, the model 300 may be a graph neural network. As described below in connection with FIG. 5, the model 300 may include a plurality of layers, some of which may correspond to a first graph structure (e.g., EOPA layers) and some of which may correspond to a second graph structure (e.g., SGAT layers). During inference, the model 300 may apply the layers to item embeddings that are generated for items of an input sequence, as described below in connection with FIGS. 5 and 7.

In some embodiments, the model 300, once trained using the training data 302, may be transferred to the inference server 306 via a plurality of model files 305.

In some embodiments, the model files 305 may include a plurality of files. For example, the model files 305 may include a first file that includes items of the training data 302. For example, the first file may include a list of unique items that were used by the training server 304 as part of training the model 300. As described above in connection with the training data 302, the list of unique items may, in some embodiments, be a subset of all items available, for example limited to recently selected items of a catalog of items and may be filtered to only include a subset of items of the catalog of items.

In some embodiments, the model files 305 may further include a second file that includes learned item embeddings for each of the items in the first file. Furthermore, the second file may include weights of the trained version of the model 300 that are learned by the training server 304 and that are applied by the inference server 306 as part of generating recommendations. These weights may be used when applying the EOPA and SGAT layers to obtain a session embedding at a time of inference.

In some embodiments, the model files 305 may include a third file that includes mappings between items of the training data 302 and other items of the training data 302 or items of an item catalog. For each item, the item may be mapped to a fixed number of items that are likely to be recommended for the item. For example, a given item may be mapped to 100 items that are the top item recommendations for that item. To determine the top recommended items for an item, the training server 304 may use the item embeddings derived for the plurality of items represented via the model 300. For example, for a given item, the top-100 recommended items for the item may be the items having embeddings closest to the item's embedding, and may be precomputed periodically for use at the time of inference.

The inference server 306 may be a computing environment that can host a trained version of the model 300. The inference server 306 may expose an application programming interface (API) to programs, such as the application 308, so that the programs may submit session data to the inference server 306, which may use a trained version of the model 300 (as defined by model files 305) to generate recommendations. In some embodiments, the inference server 306 is a cloud platform, and the inferencing provided by the trained version of model 300 is implemented using a microservice for real-time inferencing.

The application 308 may, in some embodiments, be a web server, application server, or mobile application server. The application 308 may call the microservice on the inference server 306. The application 308 may provide a sequence of items (e.g., an order-dependent sequence of items selected by a user on a website or mobile application) to the inference server 306, the inference server 306 may generate, using the trained version of the model 300, a recommendation for the sequence of items, and the inference server 306 may provide the recommendation to the application 310. The application 308 may then provide the recommendation to a frontend system (e.g., a mobile app or web browser) for display on a user interface.

Figure 4:
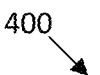
FIG. 4 is a flowchart of an example method for responding to a user selection to generate a recommendation.
Figure 4:
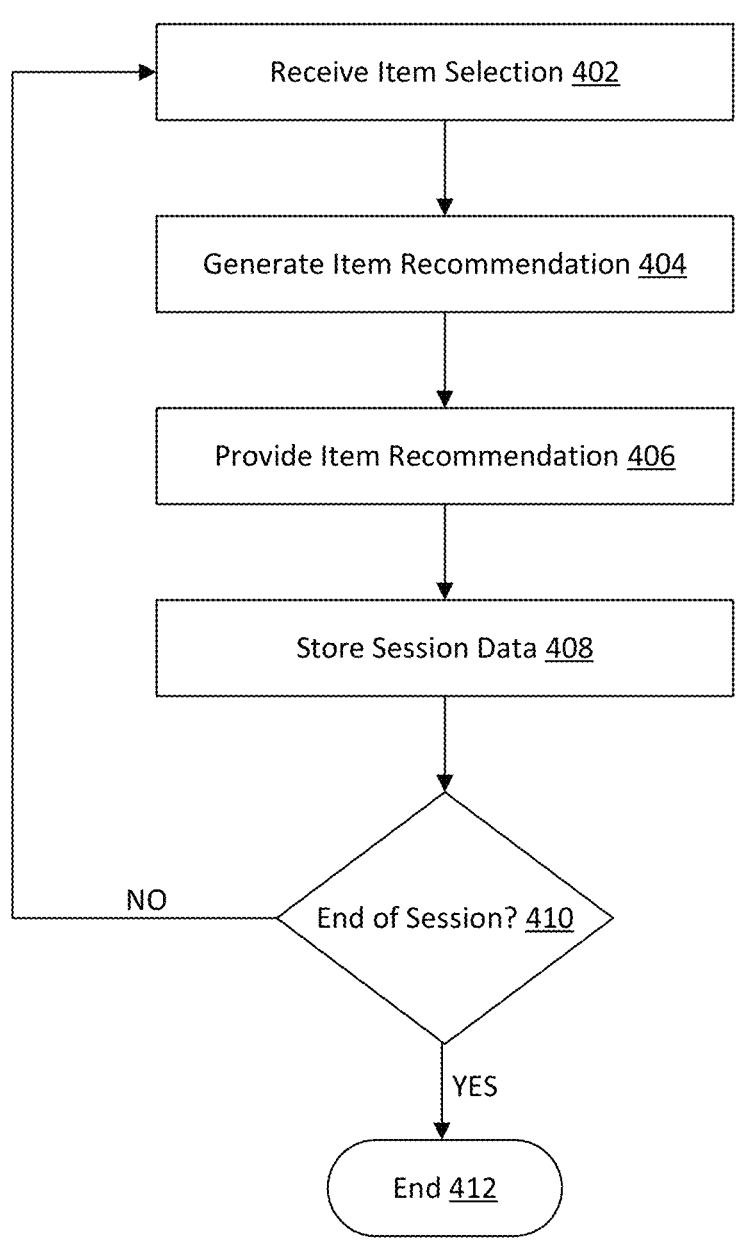

FIG. 4 is a flowchart of an example method 400. In some embodiments, operations of the method 400 may be performed by components of the information system 104. The operations of the method 400 are described herein as being performed by the recommendation system 114. However, other components may perform one or more operations of the method 400.

In the example shown, the recommendation system 114 may receive an item selection (step 402). For example, the recommendation system 114 may receive a selection of an item by a user via a user interface. The item selection may be one of a plurality of items selected by a user during a session. In some examples, the item selection is the last in a sequence of items selected by the user during the session. Examples of item selections (e.g., adding an item to a cart or viewing an item) are described above in connection with the operation 216 of FIG. 2.

In the example shown, the recommendation system 114 may generate an item recommendation (step 404). An example of generating an item recommendation is described below in connection with the method 500 of FIG. 5.

In the example shown, the recommendation system 114 may provide an item recommendation (step 406). For example, the recommendation system 114 may send the one or more items generated as part of a recommendation to another component of the information system 104 or to a device of the user that selected an item. The one or more recommended items may be displayed by a user interface via which an item was selected.

In the example shown, the recommendation system 114 may store session data (step 408). For example, the recommendation system 114 may store user activity data, data for items selected by the user during the session, recommended items, and other data.

In the example shown, the recommendation system 114 may determine whether a session is over (step 410). As described above in connection with the session data 122, the duration of a session may depend on the embodiment and may depend on a subsequent action taken by the user. In response to determining that a session is completed (e.g., taking the "YES" branch), the recommendation system 114 may end the method 400 (step 412). In response to determining that the session is not over (e.g., taking the "NO" branch), the recommendation system 114 may receive another item selection for the session, thereby returning to the step 402. In some embodiments, receiving an item selection indicates that a session is not completed.

Figure 5:
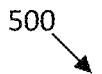
FIG. 5 is a flowchart of an example method for generating an item recommendation.
Figure 5:
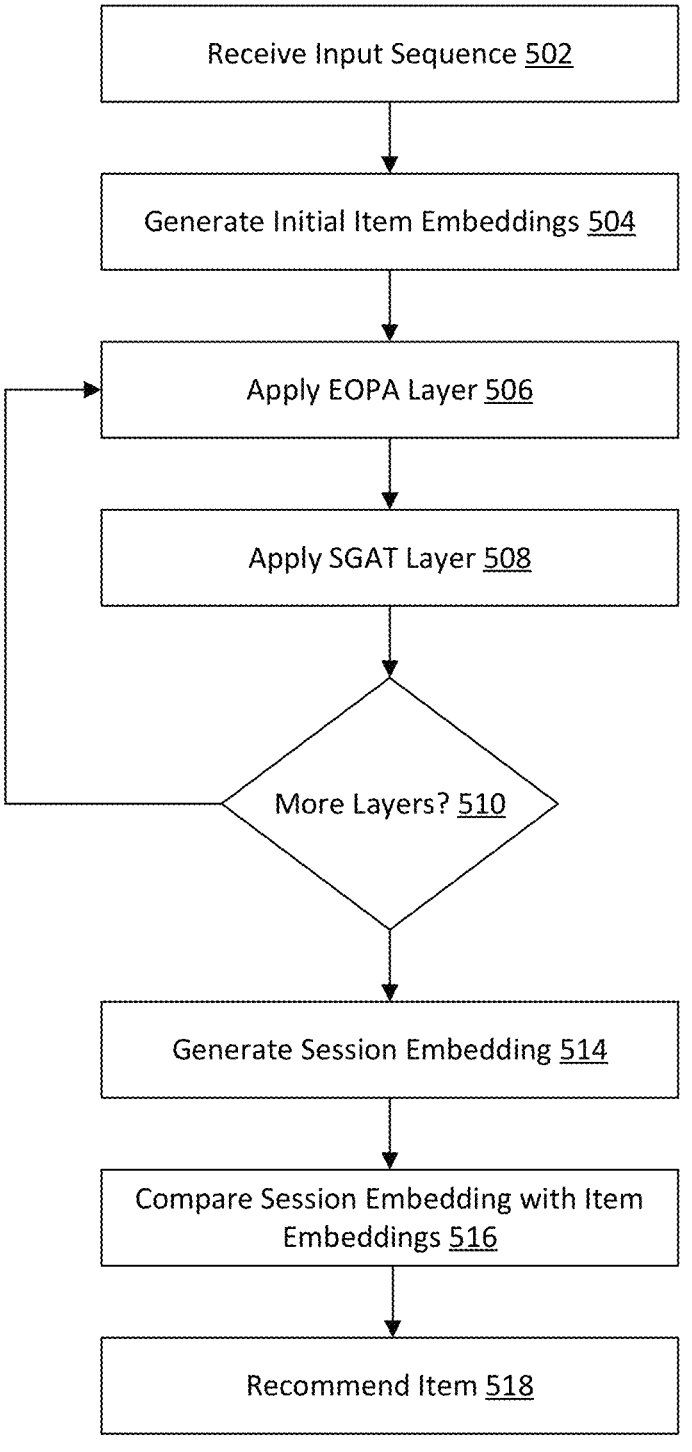

FIG. 5 is a flowchart of a method 500. The recommendation system 114 may use the method 500 to generate item recommendations (e.g., to perform the step 404 of FIG. 4). In some embodiments, the recommendation system 114 may use the model 300 during an inference stage to determine which items to recommend. In some instances, the recommendation system 114 may perform the method 500 each time that a user selects an item during a session. In some embodiments, the recommendation system 114 may only perform the method 500 if at least two items have been selected during a session.

Advantageously, the method 500 may be performed in real time in response to a user selection of an item. As a result, the recommendation system 114 may recommend items that are tailored to a user's current session. The recommendation system 114 may account for a plurality of items selected by the user during the session and an order in which the items are selected. Such a tailored approach may, in some instances, be impractical for a method that extensively relies on precomputed recommendations, since the number of possible item sequences generated during a user session may be vast.

In the example shown, the recommendation system 114 may receive an input sequence (step 502). The input sequence may be a sequence of items selected by a user. The input sequence may be represented as a graph. Nodes of the graph may represent items, and edges of the graph may represent transitions from one node to the next. For example, if the user first selects milk and then selects eggs, then the graph may include a node that represents milk, a node that represents eggs, and an edge that goes from the "milk node" to the "egg node." As a user selects more items, the graph may expand to include additional nodes and edges. Depending on the embodiment, the data structure used to implement the graph may vary. The graph may be represented using one or more of adjacency matrices, lists, hash tables, or another data structure.

In some embodiments, it may be then determined whether the recommendation system 114 is configured to provide a recommendation for the items in the input sequence. For example, the recommendation system 114 may only train, in some examples, to generate recommendations for a subset of items of a catalog of items. In some embodiments, if the input sequence includes—or if the last item in the input sequence is—an item for which the recommendation system 114 was not trained, then a different or legacy recommendation system may be used to generate a recommendation for the input sequence. In some embodiments, the recommendation system 114 may be used in combination with the different or legacy recommendation system.

In some embodiments, the recommendation system 114 may generate multiple graphs from the input sequence. As described below in connection with the steps 506-508, these graphs may be used as layers of a graph neural network. For example, the recommendation system 114 may generate an edge-order preserving aggregation (EOPA) graph. The EOPA graph may number edges in the graph, thereby preserving the order in which items were selected. For example, if a user selects milk then eggs then sugar, the EOPA graph for that sequence of item selections may include an edge ordered as edge "1" between milk and eggs and an edge ordered as edge "2" between eggs and sugar.

As another example graph, the recommendation system 114 may generate a shortcut graph attention (SGAT) graph. In the SGAT graph, there may be an edge that directly connects each item to all items that occur later in the input sequence. For example, if the user selects milk then eggs then sugar, the SGAT graph may include an edge between milk and eggs, an edge between eggs and sugar, and an edge between milk and sugar, even though the user did not select sugar directly after selecting eggs. Furthermore, in some embodiments, the SGAT graph may include edges that go out from, and enter into, a same node (e.g., an edge may leave from a node that represent milk and lead to the same node that represents milk, thereby forming a loop).

In the example shown, the recommendation system 114 may generate initial item embeddings (step 504). For example, for each of the items in the input sequences received by the recommendation system, the recommendation system may generate an embedding (e.g., a real-valued vector). The number of dimensions in the embeddings may vary depending on an optimal dimensionality as determined during training or validation. In some embodiments, the recommendation system 114 may determine initial embeddings for each item of a plurality of items in a catalog as part of training the model 300. Then during an inference stage, the recommendation system 114 may, for each item of the input sequence, assign the learned embedding to the item as an initial embedding. Training the model 300 to determine weights and initial embeddings is further described below in connection with FIG. 6. In some embodiments, the initial embeddings may be generated in a different manner.

In the example shown, the recommendation system 114 may apply an EOPA layer (step 506). As part of applying the EOPA layer, the recommendation system 114 may update item embeddings by using the EOPA graph generated for the received input sequence. In some embodiments, a message passing algorithm may be performed to update embeddings each node (e.g., item). As part of message passing, each node may be updated based at least in part on values determined for neighboring nodes in the EOPA graph. The magnitude of an update for a node may depend at least in part on weights learned during a training of the model 300 and the EOPA graph. The update function and message page algorithm that are used may vary depending on the embodiment. In some embodiments, an aggregator may be used as part of updating item embeddings. For example, a recurrent neural network aggregator (e.g., a gating mechanism, such as a gated recurrent unit) may be used in some embodiments.

In the example shown, the recommendation system 114 may apply a SGAT layer (step 508). For example, the recommendation system 114 may update the item embeddings by using an SGAT graph generated for the received input sequence. In some embodiments, the recommendation system 114 may update node embeddings by propagating data from neighboring nodes in the SGAT graph. As part of doing so, the recommendation system 114 may apply weights learned during a training process. In some embodiments, the recommendation system 114 may apply a message passing algorithm as part of applying the SGAT layer. Depending on the embodiment, an update and the message passing algorithm may vary. In some embodiments, the SGAT layer is applied prior to the EOPA layer.

In the example shown, the recommendation system 114 may determine whether there are more layers to apply (step 510). The number of layers of the model 300 may vary depending on the embodiment. For example, the model 300 may include between one and ten sets of an EOPA layer and an SGAT layer that interwoven and applied to an input graph. In response to determining that there are more layers to apply (e.g., taking the "YES" branch), the recommendation system 114 may return to apply another EOPA layer (step 506). In response to determining that there are not any more layers to apply (e.g., taking the "NO" branch), the recommendation system 114 may proceed to a subsequent step.

In the example shown, the recommendation system 114 may generate a session embedding (step 514). For example, the recommendation system 114 may generate an embedding that represents the session graph after the item embeddings were updated by application of the graph neural network layers during the steps 506-508. In some embodiments, the recommendation system 114 may generate the session embedding by aggregating the embeddings of each of the nodes. For example, depending on the embodiment, the recommendation system 114 may concatenate, average, or sum the item embeddings. In some embodiments, the recommendation system 114 may apply an attention mechanism as part of generating the session embedding. As a result, the session embedding may be updated based at least in part on long-range dependencies of selected items.

In the example shown, the recommendation system 114 may compare the session embedding with item embeddings (step 516). In some embodiments, the recommendation system 114 may determine an embedding for each item of a plurality of items of a catalog. The recommendation system 114 may compare the session embedding (generated at the step 514) to item embeddings of each of the items in the catalog. In some embodiments, however, the recommendation system 114 may only determine item embeddings for a subset of items for which the recommendation system 114 is trained, thereby speeding up training time and reducing costs (e.g., processing time and power), as described above in connection with FIG. 3.

In some embodiments, the recommendation system 114 may compare the session embedding to a subset of item embeddings. For example, the recommendation system 114 may, in some embodiments, use a heuristic approach to limit the search space for determining items to recommend. For instance, the recommendation system 114 may only search the items that are most likely to be recommended based on which items are part of the input sequence.

There may be various ways in which the recommendation system 114 may limit the search space to improve inference speed. For example, the recommendation system 114 may, for each item of the input sequence, select a plurality of items that are most recommended for that item. The recommendation system 114 may combine each of these pluralities of items to create the search space. For example, the recommendation system 114 may, for each item in the input sequence, use a matrix that maps each item to a plurality of items based on an embedding similarity, as described above in connection with FIG. 3. Each of these item embeddings may be pre-computed during a training stage. In some embodiments, limiting the search space enables the recommendation system 114 to generate real-time recommendations for many users while still executing the computational steps required to apply a graph neural network to an unseen, order-dependent sequence of items. This limitation of search space reduces computation time, and allows for sequence-specific recommendations to be generated quickly (in near-realtime) in response to receipt of an item sequence (e.g., after an item is added to a sequence of items based on selection or adding to a cart via a retail website). As such, a user interface of such a retail website may be quickly updated using the generated session-based recommendations.

As an example, a user may select a first item and then a second item. The first item may be associated with items $i_{1\text{-}1}$, $i_{1\text{-}2}$, . . . $i_{1\text{-}X}$, which may be the X items that are most recommended for the first item, or have item embeddings closest to an item embedding for the first item. The second item may be associated with $i_{2\text{-}1}$, $i_{2\text{-}2}$, . . . $i_{2\text{-}X}$, which may be the X items that are most recommended for the second item or have item embeddings closest to an item embedding for the second item. The search space for the input sequence of the first item followed by the second item may include an aggregation of the most recommended items for the first item and second item, which may be $i_{1\text{-}1}$, $i_{1\text{-}2}$, . . . $i_{1\text{-}X}$, $i_{2\text{-}1}$, $i_{2\text{-}2}$, . . . $i_{2\text{-}X}$. Thus, the recommendation system 114 may, in some embodiments, only compare the generated session embedding to embeddings associated with items in this search space. In some embodiments, the search space may be implemented such that any item that is present in both $i_{1\text{-}1}$, $i_{1\text{-}2}$, . . . $i_{1\text{-}X}$ and $i_{2\text{-}1}$, $i_{2\text{-}2}$, . . . $i_{2\text{-}X}$ may only be listed once in the search space, thereby further increasing searching efficiency. As can be appreciated, the search space may expand as more items are added to the input sequence, and other methods may be used to limit the search space.

To compare embeddings, the recommendation system 114 may, in some embodiments, determine the dot product between the session embedding and item embeddings for each of the items in the search space. In some embodiments, the recommendation system 114 may determine a cosine similarity between the session embedding and each item embedding of the items in the search space.

In the example shown, the recommendation system 114 may recommend one or more items (step 518). For example, the recommendation system 114 may first determine how many items to recommend. The number of items to recommend may vary depending on a device of the user, user interface properties of a current user interface, or based on a configurable setting of the recommendation system 114. The recommendation system 114 may then select the one or more items (up to the number of items that are to be recommended) that have corresponding embeddings that are most similar to the session embedding (e.g., based on the comparison of the step 516). In some embodiments, the selected items are from among the items in the search space described above in connection with the step 516.

Because of the way in which the recommendation system trains the model 300, the embeddings that are most similar to the session embedding may correspond with items that are most likely to be selected next by the user. In some embodiments, recommendation system 114 may also consider other factors than embedding similarity. For example, the recommendation system 114 may also select items that have embeddings that are dissimilar from one another, so that items that are both likely to be selected next by the user and also different from one another may be returned.

Figure 6:
FIG. 6 is a flowchart of an example method for training a machine learning model.
Figure 6:
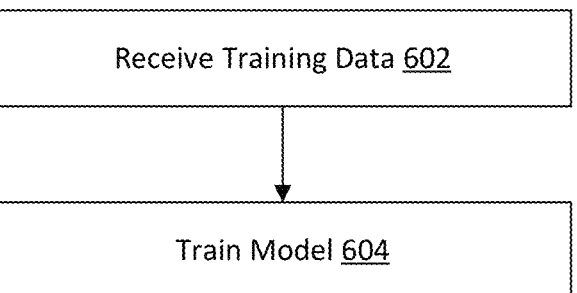

FIG. 6 is a flowchart of an example method 600. In some embodiments, the recommendation system 114 may use the method 600 to train aspects of the model 300.

In the example shown, the recommendation system 114 may receive training data (step 602). In some embodiments, the training data may include a plurality of user sessions. The plurality of user sessions may each include a sequence of items selected by a user. In some embodiments, at least some of the training data may be based on historical user activity data, including purchase data and associated sequences of items viewed and/or added to the cart as part of such a purchase. In some embodiments, at least some of the training data may be synthetic. In some embodiments, the training data may be labeled. For example, a particular training instance may include a sequence of five items (or a different number of items) selected by the user. The training instance may be input into the model 300, which may predict the next (e.g., the sixth) item selected by the user. The label (e.g., the ground truth) for the training instance may be the actual next item that was selected by the user (e.g., based on the historical user activity data or based on a synthetic simulation). In some embodiments, the recommendation system 114 may also use at least some unlabeled data. In some embodiments, the training data may include, or be part of, the training data 302 of FIG. 3.

In the example shown, the recommendation system 114 may train the model 300 (step 604). To do so, the recommendation system 114 may use the training data of the step 602. For example, for each of the training instances of the training data, the recommendation system 114 may infer one or more next items, determine a loss by comparing the inference to a label, and backpropagate the loss. As part of doing so, the recommendation system 114 may update one or more of the weights of the EOPA graph, weights of the SGAT graph, or the item embeddings. In some embodiments, the recommendation system 114 may train the model 300 for multiple epochs. In some embodiments, the recommendation system 114 may use batch learning. In some embodiments, the recommendation system 114 may validate a performance of the model 300 and continue to train the model 300 until it has reached a certain performance level. In some embodiments, the model 300 may be trained to predict not only the next selected item but also the next plurality of items selected by the user.

In some embodiments, as part of training the model, the recommendation system 114 may determine, for each of a plurality of items, the most recommended items for that item. For example, for each item, the recommendation system 114 may compare a learned embedding for that item with learned embeddings for other items and select the items associated with embeddings that are closest to the item's embeddings. These selected items may be the items that are most recommended for the item. For each item, the recommendation system 114 may map the item to its associated most recommended items, and this mapping may be used, as described above in connection with FIG. 7, to increase the speed of inferencing using the trained version of the model 300.

Figure 7:
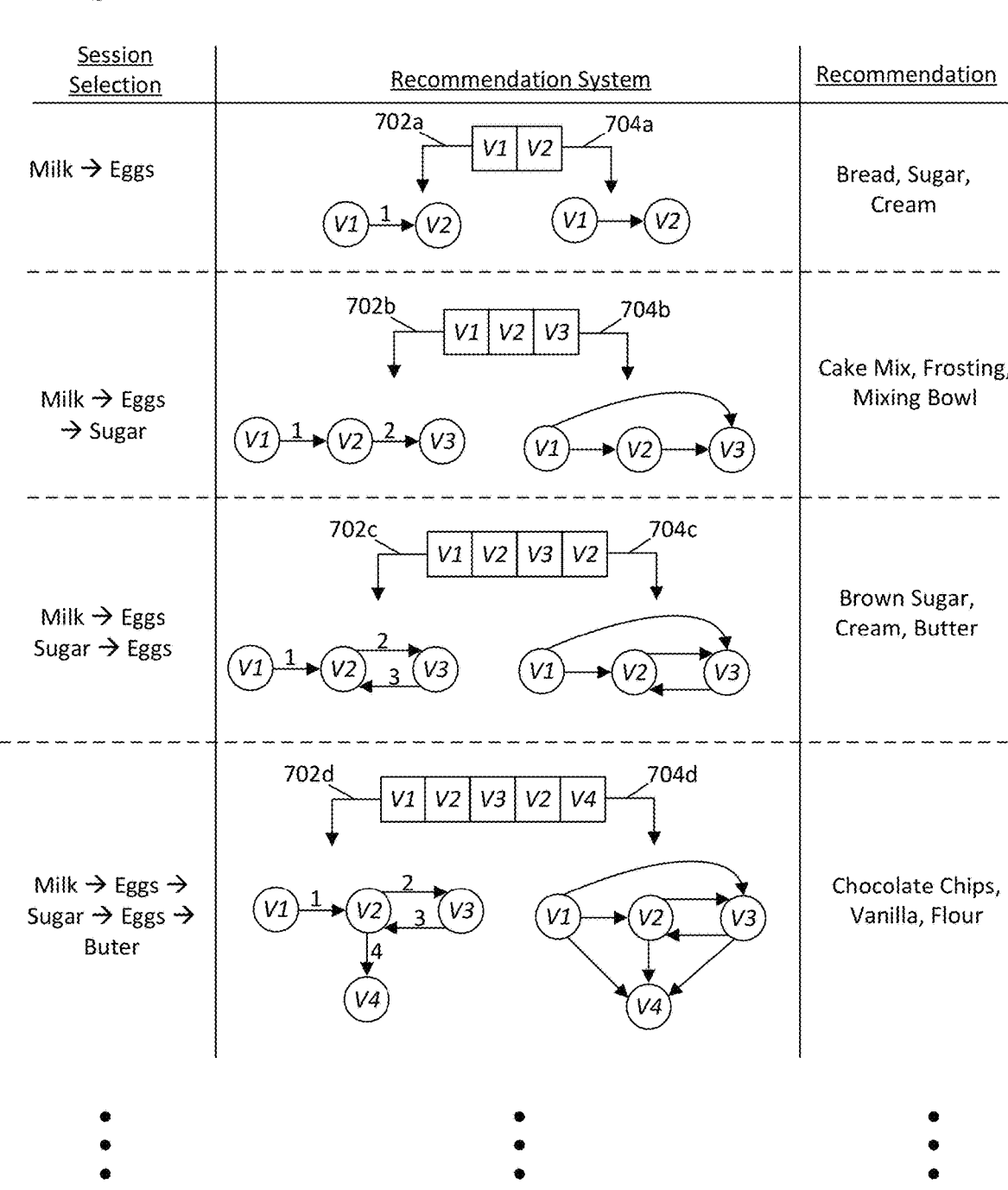
FIG. 7 illustrates a table that includes data of an example execution of aspects of the present disclosure.

FIG. 7 illustrates a table 700 with example data associated with an example user session. Data and figures illustrated in the table 700 are representations of some of the data generated by aspects of the present disclosure as part of generating item recommendations. The table 700 includes a column illustrating user selections in a session, a column that illustrates data and graphs used by the recommendation system 114, and a column that includes recommendations generated by the recommendation system 114.

As illustrated by the top row, a user may first select milk and then select eggs. These selections may be sent to the recommendation system 114 as an input sequence. The recommendation system 114 may receive, or generate, a graphical representation of the input sequence. For example, the node V1 may represent milk, and the node V2 may represent eggs, and V1 followed by V2 may indicate that the user first selected milk and then selected eggs. As described above in connection with the FIG. 5, each of the nodes may have an associated embedding that may be updated during inference. As described above in connection with FIG. 5, the recommendation system 114 may, in some embodiments, generate one or more graphs that represent the input sequence. As illustrated by the graph 702a, the recommendation system 114 may generate an EOPA graph. Furthermore, as illustrated by the graph 704a, the recommendation system 114 may generate an SGAT graph. As described above in connection with the FIG. 5, these graphs may, in some embodiments, be used as part of updating embedding for the node V1 and V2. As is further illustrated by the first row, the recommendation system 114 may generate recommendations. In the example shown, recommendation system 114 is configured to generate three recommendations. In the example shown, the recommendations may be bread, sugar, and cream. For example, the embeddings for bread, sugar, and cream may have been determined by the recommendation system 114 to be most similar to a session embedding for the input sequence that is milk then eggs.

Continuing to other rows of the table 700, the user may continue to select items. For example, in the second row, the user may then select sugar. In response, the recommendation system 114 may again generate recommendations for the new input sequences. As part of doing so, the recommendation system 114 may construct graphs for the input sequence, such as the EOPA graph 702b and the SGAT graph 704b. As illustrated by the table 700, as the user selects more items, a longer item sequence is generated, and the recommendation system 114 generates new graphs and new recommendations for the updated item sequence. For each of the updated iterations (e.g., rows), the recommendation system 114 may apply aspects of the method 500.

Figure 8:
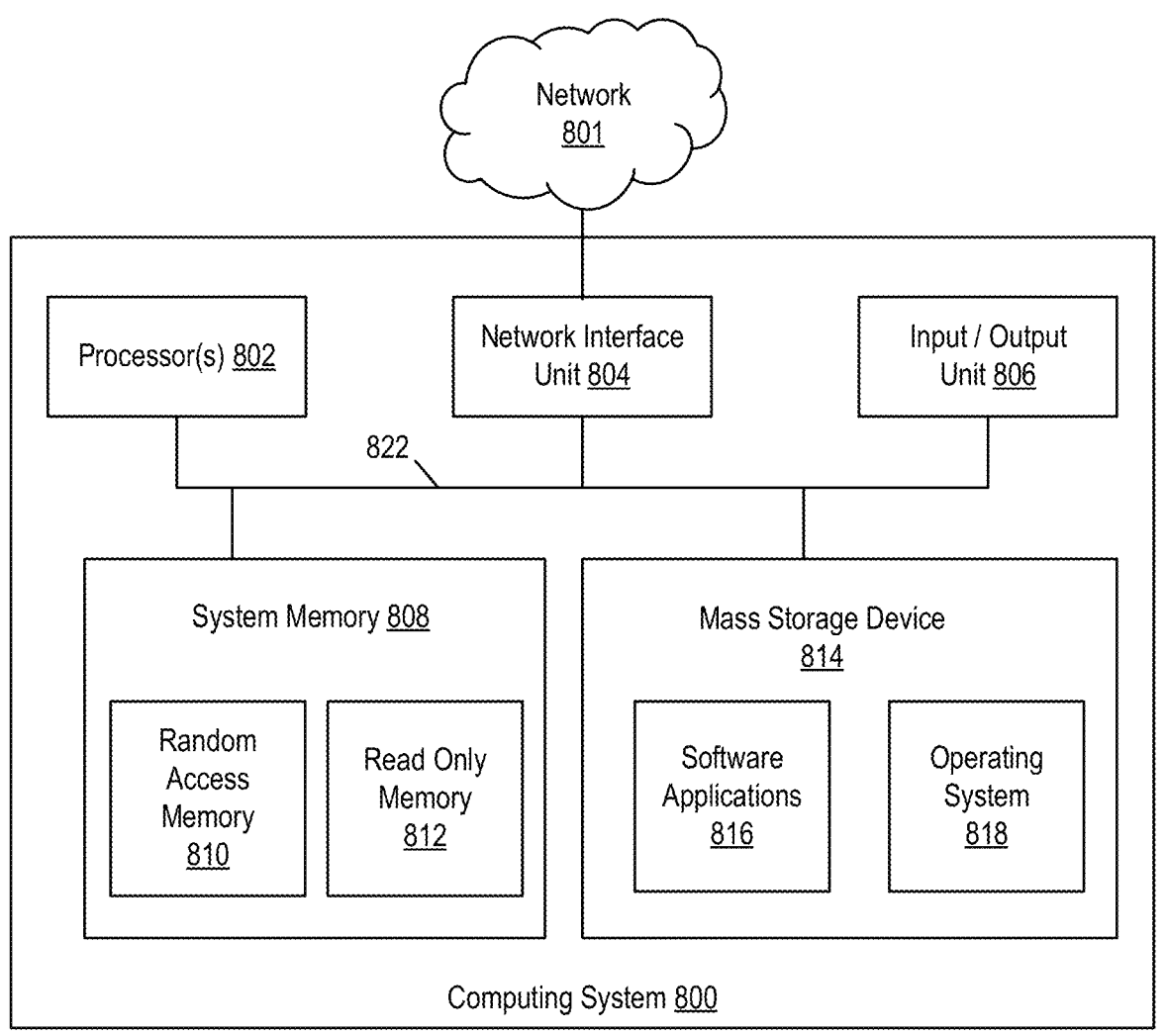
FIG. 8 is a block diagram of an example computing system.

FIG. 8 illustrates an example block diagram of a virtual or physical computing system 800. One or more aspects of the computing system 800 can be used to implement the processes, components, or systems described herein.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through the network 801. The network 801 is a computer network, such as an enterprise intranet and/or the Internet. The network 801 can include a LAN, a Wide Area Network (WAN), the Internet, wireless transmission mediums, wired transmission mediums, other networks, and combinations thereof. The computing system 800 may connect to the network 801 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions that, when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

Overall, the methods and systems described herein provide advantages relative to existing recommendation systems. For example, the neural network and method of use as described herein improves contextual recommendations generated as a user selects multiple items, for example for addition to that user's shopping cart. Where prior recommendations may be generated based on single items, single selections, or single search results, the present disclosure determines changes in context based on a combination of items selected or interacted with, thereby improving contextual knowledge and recommendation accuracy. Furthermore, the recommendations may be generated and displayed in real time as a user interacts with a website or mobile application While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of a search bar provided by a retail website, technologies disclosed herein are applicable to retail websites generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for providing session-based recommendations, the method comprising:

during an application session, receiving, at a user interface, selections of a first item and a second item by a user;

generating a first embedding for the first item;

generating a second embedding for the second item;

inferring, using a graph neural network trained to predict a next item in a sequence, a third item based on the selections of the first item and the second item, wherein inferring, using the trained graph neural network, the third item comprises:

generating a first graph comprising a first node and a second node;

assigning the first embedding to the first node;

assigning the second embedding to the second node;

modifying, using an edge-order preserving aggregation layer and a shortcut graph attention layer, the first embedding and the second embedding, wherein using the edge-order preserving aggregation comprises preserving a selection order between the first item and the second item, and performing a first message passing to update the first embedding and the second embedding based on embeddings of neighboring nodes in the first graph;

wherein using the shortcut graph attention layer comprises adding, to the first graph, shortcut edges between pairs of nodes and subsequently selected nodes without an edge, and performing a second message passing to update the first embedding and the second embedding based on embeddings of neighboring nodes in the first graph;

after applying the edge-order preserving aggregation layer and the shortcut graph attention layer, generating a session embedding by combining the updated first embedding and the updated second embedding;

searching for a nearest embedding to the session embedding in an embeddings space;

during the application session, displaying, in the user interface, the third item, wherein the third item corresponds to the nearest embedding;

during the application session, receiving, at the user interface, a selection of the third item; and during the application session, inferring, using the graph neural network, a fourth item based on the selection of the first item, the second item, and the third item wherein inferring, using the graph neural network comprises generating a second graph comprising a first node, a second node, and a third node corresponding to the first item, the second item, and the third item, respectively.

2. The method of claim 1, wherein searching for the nearest embedding comprises performing a comparison of the session embedding to a plurality of pre-computed item embeddings, the plurality of pre-computed item embeddings including a first set of pre-computed embeddings for items associated with the first item and a second set of pre-computed embeddings for items associated with the second item; and wherein the method further comprises selecting, based at least in part on the comparison, one or more items from the plurality of items of the retail catalog, wherein the one or more items include the third item.

3. The method of claim 2, wherein generating the session embedding comprises applying an attention mechanism.

4. The method of claim 1, wherein the selections of the first item and the second item by the user are an ordered sequence.

5. The method of claim 1, wherein the third item is not a preselected recommendation for the selections of the first item and the second item.

6. The method of claim 1, wherein the graph neural network does not use biographical data of the user; and wherein the graph neural network does not use historical activity data of the user.

7. The method of claim 1, wherein the application session is a browsing session or a mobile application session of the user.

8. The method of claim 1, wherein receiving the selections of the first item and the second item by the user includes receiving indications to add the first item and the second item to a shopping cart of the user.

9. The method of claim 1, wherein receiving the selections of the first item and the second item by the user includes receiving indications to view the first item and the second item.

10. The method of claim 1, wherein displaying the third item comprises presenting, in the user interface, the third item alongside a shopping cart of the user including the first item and the second item.

11. A retail web server system configured to provide recommendations to a user interface accessible to one or more users, the retail web server system comprising:

at least one processor;

a memory subsystem including one or more memories, the memory subsystem storing instructions which, when executed by the at least one processor, cause the retail web server system to perform:

during an application session, receiving, at a user interface, selections of a first item and a second item by a user;

retrieving a first embedding generated for the first item;

retrieving a second embedding for the second item;

generating a first graph comprising a first node and a second node;

assigning the first embedding to the first node;

assigning the second embedding to the second node;

predicting, using a graph neural network trained to predict a next item in a sequence, a third item based on the selections of the first item and the second item, wherein predicting, using the trained graph neural network, the third item comprises modifying, using an edge-order preserving aggregation layer and a shortcut graph attention layer, the first embedding and the second embedding, wherein using the edge-order preserving aggregation comprises preserving a selection order between the first item and the second item, and performing a first message passing to update the first embedding and the second embedding based on embeddings of neighboring nodes in the first graph;

wherein using the shortcut graph attention layer comprises adding, to the first graph, shortcut edges between pairs of nodes and subsequently selected nodes without an edge, and performing a second message passing to update the first embedding and the second embedding based on embeddings of neighboring nodes in the first graph;

after applying the edge-order preserving aggregation layer and the shortcut graph attention layer, generating a session embedding by combining the updated first embedding and the updated second embedding;

searching for a nearest embedding to the session embedding in an embeddings space;

during the application session, displaying, in the user interface, the third item, wherein the third item corresponds to the nearest embedding.

12. The retail web server system of claim 11, wherein the user interface is displayed on one or more of a mobile application or a website.

13. The retail web server system of claim 11, wherein displaying, in the user interface, the third item comprises replacing a previously recommended item with the third item.

14. The retail web server system of claim 11, wherein the instructions, when executed by the at least one processor, further cause the retail web server system to train the graph neural network using historical user activity data and synthetic simulation data.

15. The retail web server system of claim 14, wherein training the graph neural network comprises updating a weight used in the edge-order preserving aggregation layer and updating a weight used in the shortcut graph attention layer.

16. The retail web server system of claim 11, wherein the application session is a single browsing session of a single user.

17. A method for providing session-based recommendations, the method comprising:

generating a first embedding for a first item using a graph neural network trained to predict a next item in a sequence;

generating a second embedding for a second item using the graph neural network;

during an application session, receiving, at a user interface, selections of the first item and the second item by a user;

generating a first graph comprising a first node and a second node;

assigning the first embedding to the first node;

assigning the second embedding to the second node;

predicting, using the graph neural network, a third item based on the selections of the first item and the second item, wherein predicting, using the trained graph neural network, the third item comprises modifying, using an edge-order preserving aggregation layer and a shortcut graph attention layer, the first embedding and the second embedding, wherein using the edge-order preserving aggregation comprises assigning a selection order between the first item and the second item, and performing a first message passing to update the first embedding and the second embedding based on embeddings of neighboring nodes in the first graph;

wherein using the shortcut graph attention layer comprises adding, to the first graph, a shortcut edge between the first node and a subsequently selected node, and performing a second message passing to update the first embedding and the second embedding based on embeddings of neighboring nodes in the first graph;

after applying the edge-order preserving aggregation layer and the shortcut graph attention layer, generating a session embedding using the updated first embedding and the updated second embedding;

searching for a nearest embedding to the session embedding in an embeddings space; and during the application session, displaying, in the user interface, the third item, wherein the third item corresponds to the nearest embedding.

\* \* \* \* \*